J. J. WHEAT.
Process for Preserving Meats.
No. 203,682. Patented May 14, 1878.
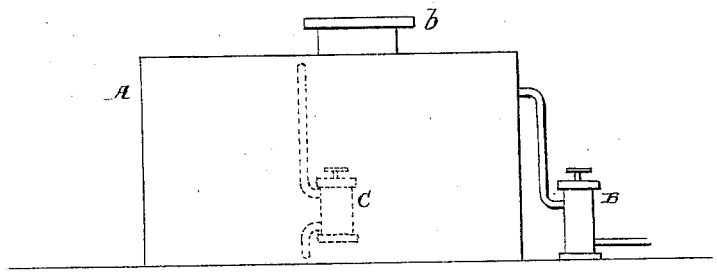
Witness:
Benjamin.
A. Scott.
Inventor
J. J. Wheat
By his attorney
Charles E. Foster

UNITED STATES PATENT OFFICE.

JOHN J. WHEAT, OF INDIANAPOLIS, INDIANA.

IMPROVEMENT IN PROCESSES FOR PRESERVING MEATS.

Specification forming part of Letters Patent No. 203,682, dated May 14, 1878; application filed March 2, 1878.

*To all whom it may concern:*

Be it known that I, JOHN J. WHEAT, of Indianapolis, Indiana, have invented Improvements in Curing Meats, of which the following is a specification:

The objects of my invention are to preserve meats without the loss of time incident to ordinary processes; to avoid the destructive results from changes which the meats undergo in such processes; to secure uniform products independent of atmospheric changes; dispense with the use of ice and the necessity of immense cooling-vaults, and to insure a product of a superior quality.

In most curing processes the meat is subjected to various changes of temperature, being either first cooled to extract the animal heat and then heated, or immersed while yet warm in liquids of a high temperature. After impregnation it is common to again reduce and then elevate the temperature.

I have found by numerous and long-continued experiments that every change of temperature is accompanied by a disorganization, impairing the quality of the meat, and that the nearer the meat is maintained at a blood-heat until thoroughly salted or impregnated, and the fewer and less abrupt the changes in temperature, the more natural is its condition when cured, the more nearly it resembles fresh meat, and the better the product.

Ordinary modes of curing meats are also objectionable from the fact that they result in the extraction of matters that it is desirable to retain, and the removal of which impairs the quality of the product. Thus, when meats are immersed in brine-water at the temperature usually employed, the albumen is extracted; if the brine is heated to a much greater extent, the tissue is disintegrated. So, also, when the brine or other antiseptic fluid is injected into the meat it flows outward, carrying with it the nutritious juices, the same result ensuing from the common process of subjecting the meat to the action of the fluid under a vacuum.

To overcome the objections incident to such processes, I am careful to avoid, in the first instance, as far as possible, any change, and especially any reduction, of temperature, and insert the meat as soon after killing as possible, and while it retains the animal heat, in an antiseptic solution at a temperature as near blood-heat as possible—that is, not less than 90° nor more than 120° Fahrenheit.

Any suitable apparatus may be used, that shown in the accompanying drawing answering the purpose very effectually.

The fluid should be in a strong vessel, A, with a movable cover, b, capable of being bolted in place after the meat is deposited, and the vessel communicating with a pump, B, by which the brine can be forced into the vessel and maintained therein under a pressure of from sixty to one hundred pounds to the square inch. I have found an average pressure of about seventy-five pounds to be the most effective. No sudden change of temperature results from the immersion of the meat in the fluid at the degree of heat named. There is consequently no organic change. The fluids are neither expelled nor solidified, nor are the tissues disintegrated. The pressure being uniform, there is no tendency to force the juices from the meat, while the antiseptic liquid penetrates equally and uniformly with greater facility, owing to the pores being all open and receptive, in consequence of the insertion of the meat without any preliminary cooling.

In ordinary processes the watery fluids from the meat collect at the surface, and dilute and prevent the penetration of the brine. This is prevented by maintaining a constant circulation of the brine by means of a circulating-pump, C, (shown in dotted lines,) revolving paddles, or by forcing the liquid slowly into and from the vessel.

Ordinary processes of preserving, where the meat is first cooled, then impregnated, and then refrigerated, require from twenty-five to sixty days to prepare the meat ready for smoking. By my above-described process I have been enabled to effect the same result in from ten to twenty-four hours.

It should be understood that the temperature of the meat is preserved for several hours after its immersion, and then gradually lowered to the required degree until the salting is completed, thus avoiding any variation of temperature until the salting has been carried to a great extent, and then only gradually decreasing, without sudden objectionable changes, before referred to.

As above described, the meat is cured without the use of ice, and in any weather, without being retarded or affected by atmospheric changes. While the application of pressure and maintaining the circulation effect important results, it will be understood that each of these features may be employed independently of the others, with great advantage in any case.

I claim—

1. As an improvement in treating meats, immersing the meat immediately after killing, and while retaining its animal heat, in an impregnating fluid at a temperature approximating the natural temperature of the blood of the living animal, and subjecting it to the action thereof until cured, as set forth.

2. The within-described process of treating meats—that is say, immersing them while they retain the animal heat in an impregnating solution at a temperature of from 90° to 120° Fahrenheit, and subjecting the same to a pressure of from sixty to one hundred pounds to the square inch from the time of immersion until impregnated, as set forth.

In testimony whereof I have signed my name to this specification in the presence of two subscribing witnesses.

J. J. WHEAT.

Witnesses:
C. E. FOSTER,
F. M. GREEN.